United States Patent
Choi et al.

(10) Patent No.: US 10,831,676 B2
(45) Date of Patent: Nov. 10, 2020

(54) APPARATUS AND METHOD FOR INTERFACING WITH COMMON MEMORY

(71) Applicant: ELECTRONICS AND TELECOMMUNICATIONS RESEARCH INSTITUTE, Daejeon (KR)

(72) Inventors: Yong-Seok Choi, Daejeon (KR); Shin-Young Ahn, Daejeon (KR); Eun-Ji Lim, Daejeon (KR); Young-Choon Woo, Daejeon (KR); Wan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/165,891

(22) Filed: Oct. 19, 2018

(65) Prior Publication Data
US 2019/0243782 A1    Aug. 8, 2019

(30) Foreign Application Priority Data
Feb. 7, 2018   (KR) .................. 10-2018-0015328

(51) Int. Cl.
*G06F 12/1081*   (2016.01)
*G06F 13/28*   (2006.01)
*G06F 13/16*   (2006.01)

(52) U.S. Cl.
CPC ...... *G06F 12/1081* (2013.01); *G06F 13/1663* (2013.01); *G06F 13/28* (2013.01); *G06F 2212/621* (2013.01); *G06F 2213/28* (2013.01)

(58) Field of Classification Search
CPC ............ G06F 11/2043; G06F 11/2046; G06F 12/084; G06F 12/10; G06F 12/1081;
(Continued)

(56) References Cited

U.S. PATENT DOCUMENTS 8,200,911 B2   6/2012   Jeong
8,943,294 B2   1/2015   Cha et al.
(Continued)

FOREIGN PATENT DOCUMENTS

| KR | 10-0782592 B1 | 12/2007 |
| KR | 10-2010-0111915 A | 10/2010 |
| KR | 10-2017-0131127 A | 11/2017 |

OTHER PUBLICATIONS

Enhanced Serial Peripheral Interface (eSPI). Revision 1.0. Jan. 2016. Intel Corporation. (Year: 2016).*

*Primary Examiner* — Thomas J. Cleary (57) ABSTRACT

Disclosed herein are an apparatus and method for interfacing with common memory. The apparatus for interfacing with common memory includes a computer-input/output (I/O)-interface-protocol-processing unit for receiving a packet for accessing common memory from a computer; a direct memory access unit for transforming the packet into an instruction for performing any one of reading from and writing to the common memory; and a common memory interface unit for transmitting the instruction to the common memory and receiving information about whether execution of the instruction is completed from the common memory.

7 Claims, 8 Drawing Sheets

(58) Field of Classification Search
CPC ............. G06F 13/1652; G06F 13/1663; G06F 13/1668; G06F 13/1673; G06F 13/28; G06F 15/17331; G06F 2212/621; G06F 2213/28
See application file for complete search history.

(56) References Cited

U.S. PATENT DOCUMENTS

| | | | |
|---|---|---|---|
| 9,519,597 B2 | 12/2016 | Song et al. | |
| 2002/0029334 A1* | 3/2002 | West | G06F 9/5016 713/2 |
| 2003/0135699 A1* | 7/2003 | Matsuzaki | G06F 13/1605 711/149 |
| 2004/0176857 A1* | 9/2004 | Tsunedomi | G05B 19/0421 700/2 |
| 2005/0027920 A1* | 2/2005 | Fitzsimmons | G06F 13/4022 710/317 |
| 2005/0172043 A1* | 8/2005 | Nonaka | G06F 3/0614 710/5 |
| 2006/0047900 A1* | 3/2006 | Tanaka | G06F 3/0614 711/113 |
| 2007/0168610 A1* | 7/2007 | Kobayshi | G06F 3/061 711/114 |
| 2007/0234021 A1* | 10/2007 | Ruberg | G06F 13/4054 712/244 |
| 2008/0046665 A1* | 2/2008 | Kim | G06F 9/541 711/149 |
| 2008/0172525 A1* | 7/2008 | Nakamura | G06F 3/0608 711/113 |
| 2009/0248993 A1* | 10/2009 | Miura | G06F 13/1663 711/149 |
| 2009/0254507 A1* | 10/2009 | Hosoya | G06F 3/0608 706/48 |
| 2013/0019069 A1* | 1/2013 | Yamashita | G06F 9/5016 711/149 |
| 2014/0189197 A1* | 7/2014 | Krithivas | G06F 12/0246 711/103 |
| 2015/0180574 A1* | 6/2015 | Choi | H04B 10/801 398/115 |
| 2015/0378629 A1* | 12/2015 | Suzuki | G06F 3/0619 711/154 |
| 2016/0011987 A1* | 1/2016 | Bouley | G06F 12/1081 710/308 |
| 2017/0139850 A1* | 5/2017 | Yoon | G06F 12/0813 |
| 2017/0337966 A1 | 11/2017 | Kim et al. | |
| 2018/0173657 A1* | 6/2018 | Berntsen | G06F 13/28 |
| 2018/0341491 A1* | 11/2018 | Choi | G06F 9/322 |
| 2018/0352557 A1* | 12/2018 | Bhatt | G06F 9/5077 |

* cited by examiner

APPARATUS AND METHOD FOR INTERFACING WITH COMMON MEMORY

CROSS REFERENCE TO RELATED APPLICATION

This application claims the benefit of Korean Patent Application No. 10-2018-0015328, filed Feb. 7, 2018, which is hereby incorporated by reference in its entirety into this application.

BACKGROUND OF THE INVENTION

1. Technical Field

The present invention relates generally to technology for sharing memory between computers, and more particularly to technology for sharing memory between computers through which all computers may access the same memory space.

2. Description of the Related Art

A computer includes one or more Central Processing Units (CPUs), memory, and an input/output (I/O) slot. The memory of a first computer is used exclusively by the first computer. When the first computer attempts to read from the memory of a second computer or write data thereto, the first computer uses a network interface card installed in an I/O slot thereof.

Here, the first computer transmits an instruction to the network interface card thereof, and the network interface card transmits the instruction to the network interface card connected to the I/O slot of the second computer via a network switch. The CPU of the second computer may receive the instruction through the I/O slot thereof and allow access to the memory thereof.

Generally, a computer has limits on the amount of memory that it can support. Accordingly, data commonly used by all computers connected via a network switch are stored in the respective computers in a distributed manner.

When N computers share data therebetween, data stored in the memory of the respective computers in a distributed manner may be accessed through N*N memory access attempts. That is, with an increase in the number of computers, the required number of memory access attempts increases exponentially.

Meanwhile, after a computer having a large amount of memory is selected, the computer may be implemented to be used only for the purpose of storing shared data. For example, when the memory of the second computer is used only for the purpose of storing shared data, because all computers must access the second computer through the network interface card of the second computer via a network switch, parallel processing is impossible due to the characteristics of network packet communication.

That is, because access attempts to the memory of the second computer are sequentially processed, the network load required to be processed by the network interface card of the second computer increases. Also, because such memory access attempts are processed only by the CPU of the second computer, a bottleneck may be formed. Further, because the network interface card and the CPU of the second computer must process a complicated network stack, data are frequently copied therebetween, which may cause unnecessary power consumption and the waste of resources.

Therefore, it is necessary to develop technology for sharing memory between computers that may solve problems in which the number of memory access attempts increases exponentially when shared data are stored in the memory of computers in a distributed manner and in which the network load increases and a bottleneck is formed when shared data are concentrated in a single computer.

DOCUMENTS OF RELATED ART (Patent Document 1) Korean Patent Application Publication No. 10-2016-0068633, published on Jun. 15, 2016 and titled "Multiprocessor communication system sharing physical memory and communication method thereof".

SUMMARY OF THE INVENTION

An object of the present invention is to solve the problem in which the number of memory access attempts increases exponentially when shared data are distributed across the memory of respective computers.

Another object of the present invention is to solve the problem in which, when shared data are stored intensively in a single computer, a bottleneck is formed in the CPU of the corresponding computer and the network load thereof increases.

In order to accomplish the above objects, an apparatus for interfacing with common memory according to an embodiment of the present invention includes a computer-input/output (I/O)-interface-protocol-processing unit for receiving a packet for accessing common memory from a computer; a direct memory access unit for transforming the packet into an instruction for performing any one of reading from and writing to the common memory; and a common memory interface unit for transmitting the instruction to the common memory and receiving information about whether execution of the instruction is completed from the common memory.

Here, the direct memory access unit may record an address of the common memory, a physical address of the memory of the computer, and the instruction to a memory field.

Here, the memory field may include a field for recording the address of the common memory; a field for recording the physical address of the memory of the computer; and a field for recording the instruction.

Here, the direct memory access unit may record the instruction after the address of the common memory and the physical address of the memory of the computer are recorded.

Here, the common memory interface unit may receive information about whether execution of the instruction is completed from the common memory.

Here, the direct memory access unit may record the information about whether execution of the instruction is completed and then cause an interrupt, thereby notifying the computer of the information about whether execution of the instruction is completed.

Here, the direct memory access unit may record the information about whether execution of the instruction is completed to the field for recording the instruction.

Here, the computer may read the field for recording the instruction, and check the information about whether execution of the instruction is completed.

Here, the computer may read the field for recoding the instruction, and check the information about whether execution of the instruction is completed.

Also, in order to accomplish the above objects, a method for interfacing with common memory in which an apparatus for interfacing with common memory is used according to an embodiment of the present invention includes receiving a packet for accessing common memory from a computer; transforming the packet into an instruction for performing any one of reading from and writing to the common memory; and transmitting the instruction to the common memory and receiving information about whether execution of the instruction is completed from the common memory.

Here, transforming the packet may be configured to record an address of the common memory, a physical address of the memory of the computer, and the instruction to a memory field.

The memory field may include a field for recording the address of the common memory; a field for recording the physical address of the memory of the computer; and a field for recording the instruction.

Here, transforming the packet may be configured to record the instruction after the address of the common memory and the physical address of the memory of the computer are recorded.

Here, transmitting the instruction may be configured to receive information about whether execution of the instruction is completed from the common memory.

Here, transmitting the instruction may be configured to record the information about whether execution of the instruction is completed, to cause an interrupt, and to thereby notify the computer of the information about whether execution of the instruction is completed.

Here, transmitting the instruction may record the information about whether execution of the instruction is completed to the field for recording the instruction.

Here, transmitting the instruction may be include the computer reads the field for recording the instruction, and checks the information about whether execution of the instruction is completed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

Figure 1:
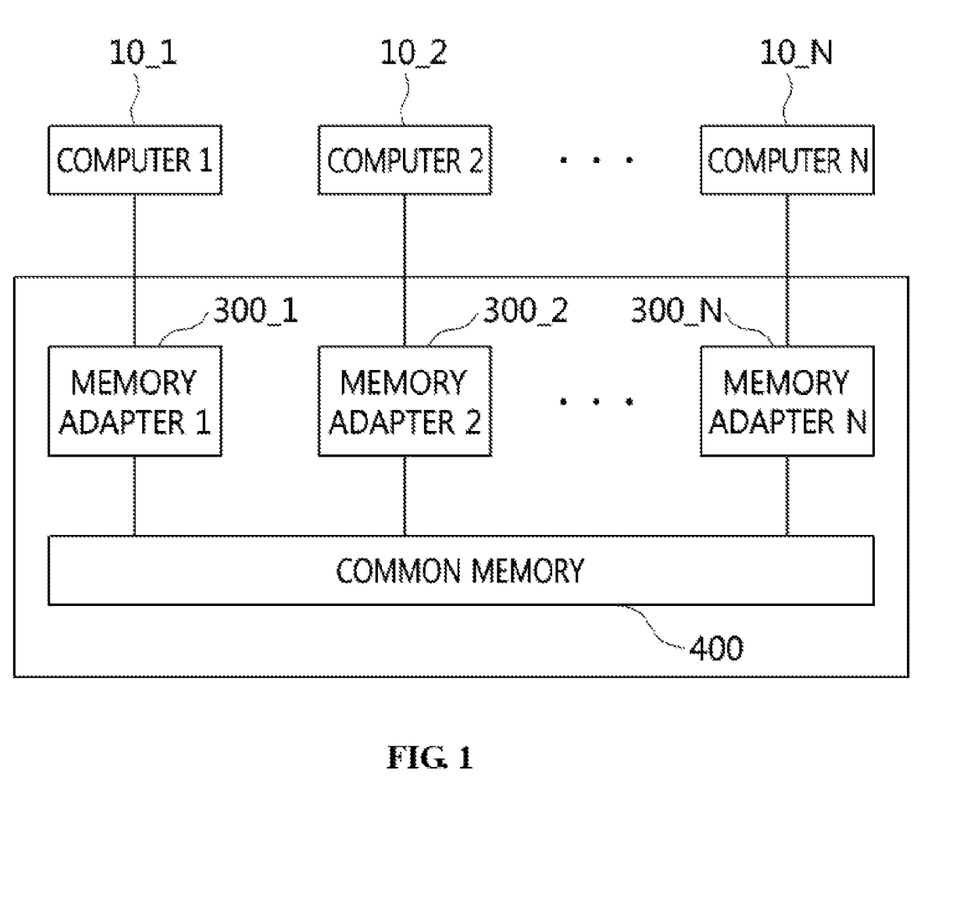
FIG. 1 is a view that schematically shows an environment in which an apparatus for sharing memory between computers according to an embodiment of the present invention is applied.

FIG. 1 is a view that schematically shows an environment in which an apparatus for sharing memory between computers according to an embodiment of the present invention is applied.

As illustrated in FIG. 1, a system for sharing memory between computers includes multiple computers 10, multiple memory adapters 300, and a common memory 400.

The apparatus for sharing memory between computers contains the common memory 400, including actual physical memory, instead of a conventional network switch. The respective computers 10 access the common memory 400 using the memory adapters 300, rather than using network interface cards.

Each of the computers 10 includes a Central Processing Unit (CPU), memory, and an input/output (I/O) slot. The first computer 10_1 uses the common memory 400 in order to send and receive data to and from another computer, thereby preventing a bottleneck.

Each of the computers 10 may access the entire area of the common memory 400, and may exchange data by reading and writing the data from and to the common memory 400. Also, because each of the computers 10 operates as if it had the entire common memory 400 when it accesses the common memory 400, the computer 10 may access the common memory 400 in a manner similar to the method used when it accesses its main memory.

Each of the multiple memory adapters 300 may be implemented so as to be installed in the I/O slot of a corresponding one of the multiple computers 10. The computers 10 may access the common memory 400 through the memory adapters 300 and access the physical memory array of the common memory 400 through the common memory interface of the common memory 400.

For the convenience of description, the first memory adapter 300_1 and the second memory adapter 300_2 are illustrated as being installed in the first computer 10_1 and the second computer 10_2, respectively, but the first memory adapter 300_1 and the second memory adapter 300_2 may perform the same function.

The common memory 400 receives instructions in the form of packets from the multiple adapters 300, transforms each of the instructions into an address, performs an operation corresponding to the instruction for the memory cell corresponding to the address, and transmits the result of the operation to the corresponding memory adapter 300.

Hereinafter, the configuration of an apparatus for sharing memory between computers according to an embodiment of the present invention will be described in more detail with reference to FIGS. 2 to 4.

Figure 2:
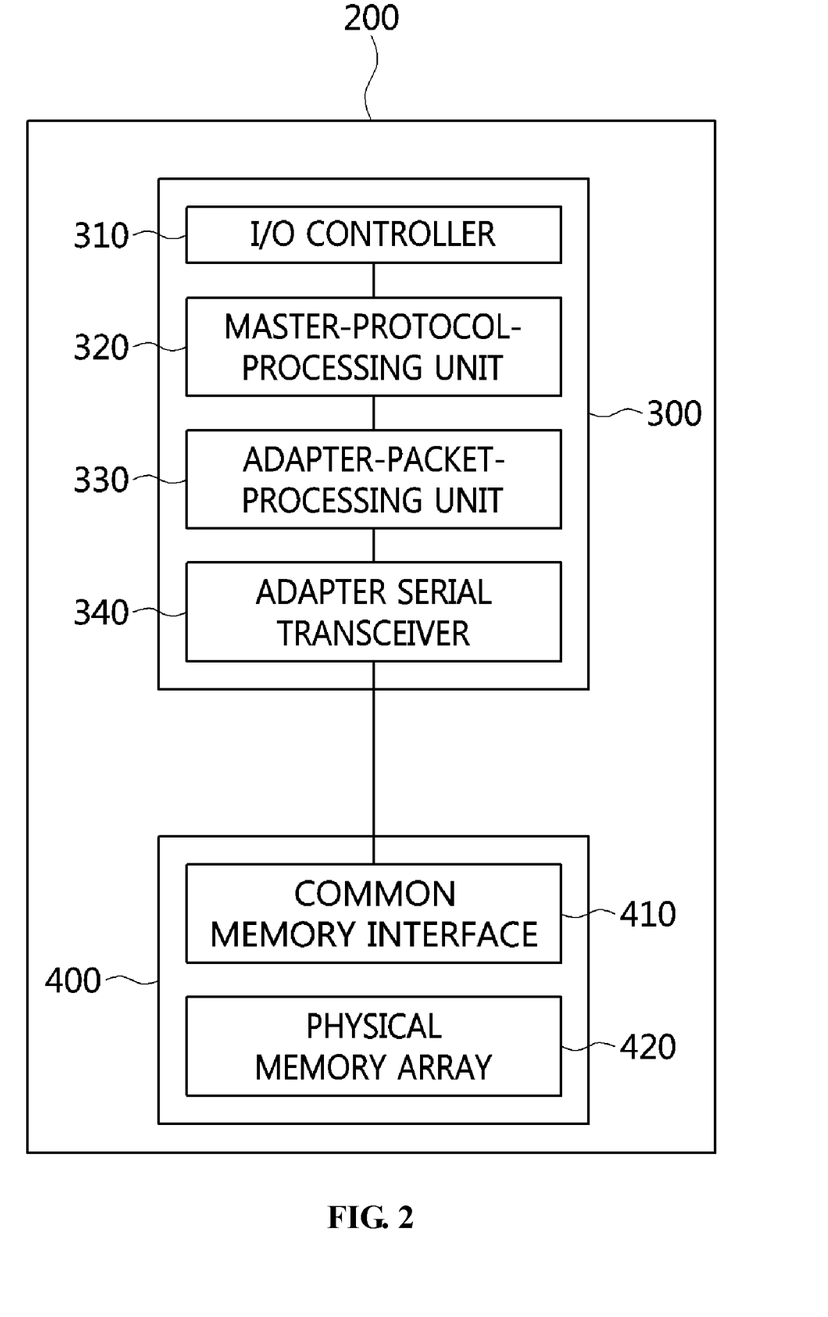
FIG. 2 is a block diagram that shows the configuration of an apparatus for sharing memory between computers according to an embodiment of the present invention.

FIG. 2 is a block diagram that shows the configuration of an apparatus for sharing memory between computers according to an embodiment of the present invention.

As illustrated in FIG. 2, the apparatus 200 for sharing memory between computers includes one or more memory adapters 300 and a common memory 400. The memory adapter 300 includes an input/output (I/O) controller 310, a master-protocol-processing unit 320, an adapter-packet-processing unit 330 and an adapter serial transceiver 340. The common memory 400 includes a common memory interface 410 and a physical memory array 420.

The components of the memory adapter 300 will be described in detail with reference to FIG. 3, and the components of the common memory 400 will be described in detail with reference to FIG. 4.

In FIG. 2, the serial transceiver 340 is illustrated as being included only in the memory adapter 300 for the convenience of description, but the serial transceiver for the common memory 400 may be included in the common memory interface 410. Here, the adapter serial transceiver 340 and the memory serial transceiver correspond to each other in a one-to-one manner.

A description of the adapter serial transceiver 340 included in the memory adapter 300 and a description of the memory serial transceiver included in the common memory 400 will be made with reference to FIG. 3 and FIG. 4.

Figure 3:
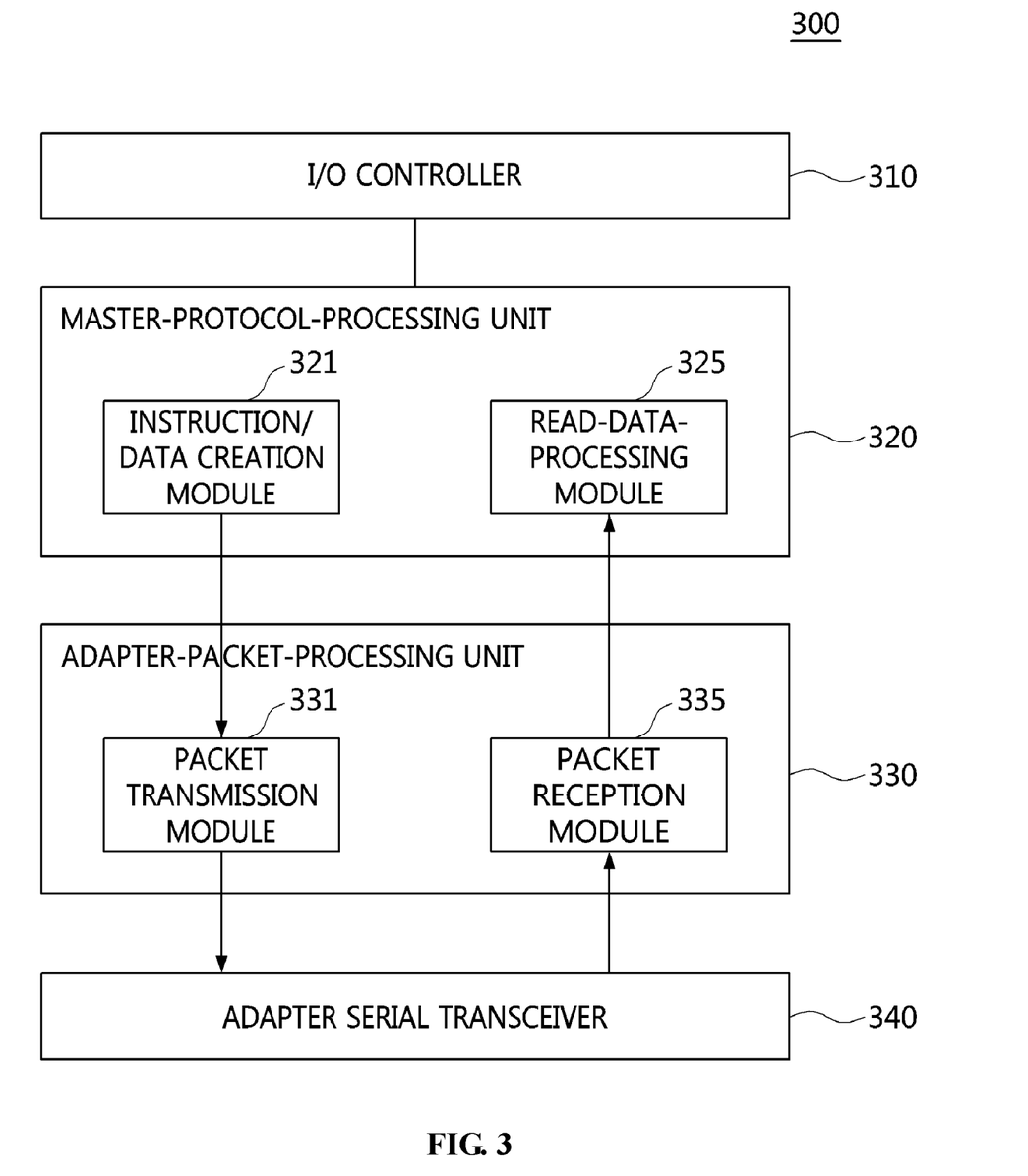
FIG. 3 is a block diagram that shows the configuration of a memory adapter according to an embodiment of the present invention.

FIG. 3 is a block diagram that shows the configuration of a memory adapter according to an embodiment of the present invention.

The I/O controller 310 of a memory adapter 300 communicates with a computer equipped with the memory adapter 300. The I/O controller 310 may receive an address corresponding to an instruction from the computer and transmit read data to the computer.

The master-protocol-processing unit 320 transforms a received address into an instruction or processes read data.

Also, the master-protocol-processing unit 320 may match a read address with read data and perform management and monitoring functions. As illustrated in FIG. 3, the master-protocol-processing unit 320 may include an instruction/data generation module 321 and a read-data-processing module 325.

The adapter-packet-processing unit 330 may transform an instruction into a packet and transmit the packet to the common memory 400 through the adapter serial transceiver 340. Here, the adapter serial transceiver 340 and the memory serial transceiver, included in the common memory 400, correspond to each other in a one-to-one manner.

Also, the adapter-packet-processing unit 330 may receive read data from the common memory 400 through the adapter serial transceiver 340 and deliver the same to the master-protocol-processing unit 320. In addition to packet transmission and reception, the adapter-packet-processing unit 330 may function to manage and monitor the adapter serial transceiver, to verify data integrity, and to control data flow.

The adapter-packet-processing unit 330 may include a packet transmission module 331 and a packet reception module 335, as shown in FIG. 3.

Figure 4:
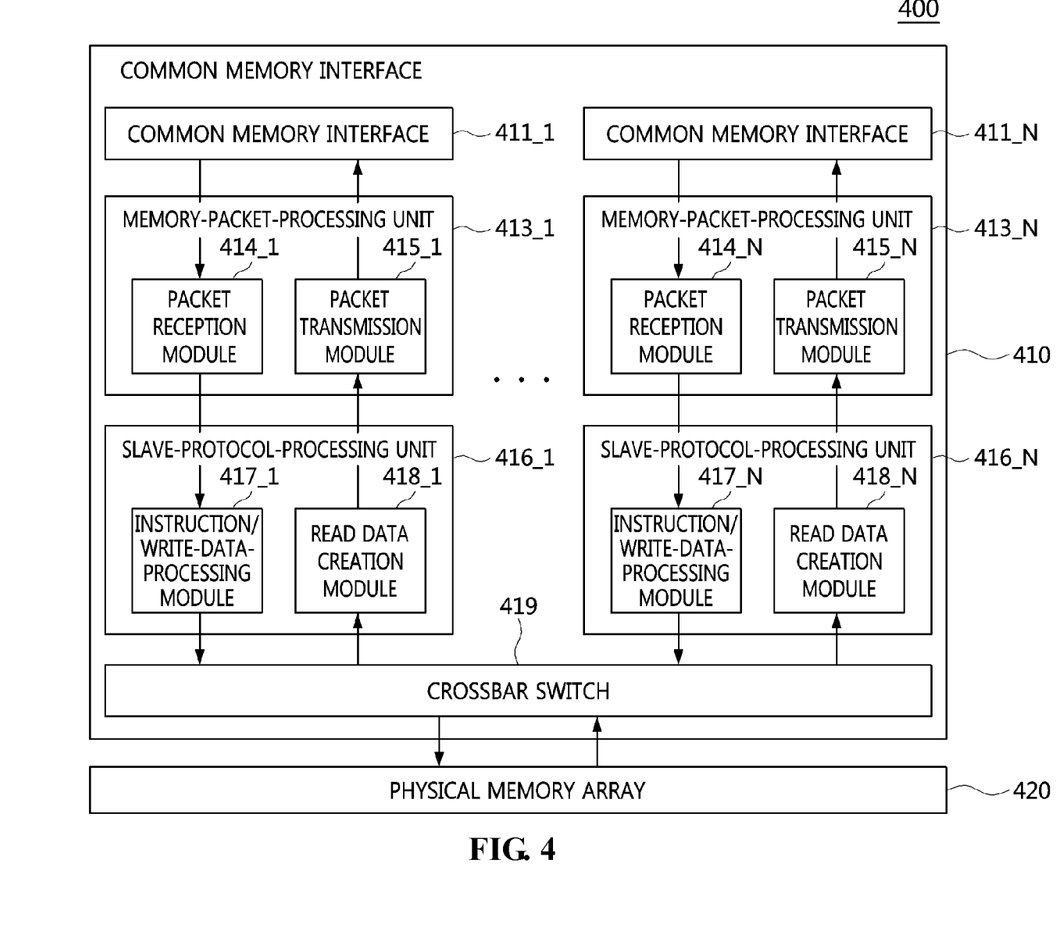
FIG. 4 is a block diagram that shows the configuration of common memory according to an embodiment of the present invention.

FIG. 4 is a block diagram that shows the configuration of common memory according to an embodiment of the present invention.

As illustrated in FIG. 4, the common memory 400 includes a common memory interface 410 and a physical memory array 420. The common memory interface 410 includes one or more memory serial transceivers 411, one or more memory-packet-processing units 413, a slave-protocol-processing unit 416, and a crossbar switch 419.

The memory serial transceiver 411 communicates with the adapter serial transceiver 340, and the memory-packet-processing unit 413 processes an instruction in the form of a packet, which is received by the memory serial transceiver 411. The slave-protocol-processing unit 416 transforms the processed instruction into an address, and the crossbar switch 419 performs an operation corresponding to the instruction for the memory cell corresponding to the address.

The memory-packet-processing unit 413 may include a packet reception module 414 and a packet transmission module 415, and the slave-protocol-processing unit 416 may include an instruction/write-data-processing module 417 and a read data generation module 418.

Hereinafter, a method for sharing memory between computers, performed by an apparatus for sharing memory between computers according to an embodiment of the present invention, will be described in detail with reference to FIG. 5.

Figure 5:
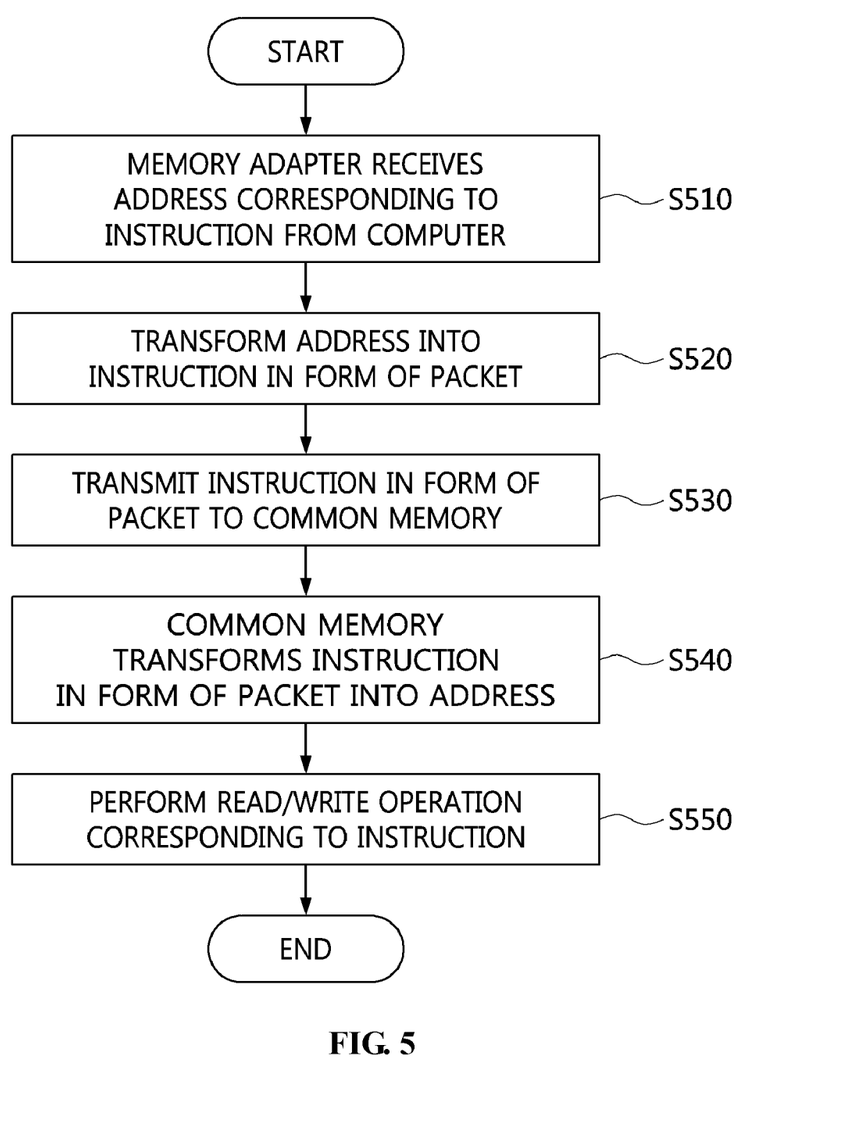
FIG. 5 is a flowchart for explaining a method for sharing memory between computers performed by an apparatus for sharing memory between computers according to an embodiment of the present invention.

FIG. 5 is a flowchart for explaining a method for sharing memory between computers, performed by an apparatus for sharing memory between computers according to an embodiment of the present invention.

First, the memory adapter 300 of the apparatus 200 for sharing memory between computers receives an address corresponding to an instruction from a computer 10 at step S510.

The memory adapter 300 receives an address corresponding to a write instruction or a read instruction from the I/O slot of the computer 10. Here, the memory adapter 300 may receive data to be written and a write address at which the data are to be written in the case of a write instruction, or may receive a read address at which data are to be read in the case of a read instruction.

Then, the memory adapter 300 of the apparatus 200 for sharing memory between computers transforms the received address into an instruction in the form of a packet at step S520, and transmits the instruction in the form of a packet to the common memory 400 of the apparatus 200 for sharing memory between computers at step S530.

Because the memory adapter 300 and the common memory 400 communicate with each other using packets, the memory adapter 300 transforms the read address or the write address into the instruction in the form of a packet and transmits the instruction in the form of a packet to the common memory 400.

Then, the common memory 400 of the apparatus 200 for sharing memory between computers transforms the instruction in the form of a packet into an address at step S540, and performs a read or write operation corresponding to the instruction at step S550.

When the instruction corresponds to a write operation, the common memory 400 may store data in the memory cell corresponding to the write address. Conversely, when the instruction corresponds to a read operation, the common memory 400 may read data from the memory cell corresponding to the read address and deliver the read data to the computer 10.

For example, when the computer 10 attempts to write to the common memory 400, the CPU of the computer 10 may receive data to be written from the memory thereof or generate data to be written by itself and send the data to be written and the write address at which the data are to be written to the memory adapter 300 via the I/O slot.

The memory adapter 300 receives the data to be written and the write address through the I/O controller, and the instruction/data generation module transforms the data and the write address into a write instruction and data. The transformed write instruction and data may be transformed into a packet in the packet transmission module of the memory adapter 300, and may then be transmitted in the form of a signal through the adapter serial transceiver. Here, the signal may be at least one of an optical signal, an electric signal, and a radio-wave signal.

The common memory interface 410 of the common memory 400 may receive the write instruction and data, which are transmitted through an optical cable, electric cable, or air medium, using the memory serial transceiver. After they pass through the packet reception module, the received write instruction and data are transformed back into the write address and the data to be written in the instruction/write-data-processing module of the slave-protocol-processing unit, and the write address and the data to be written are delivered to a specific memory cell in the physical memory array 420 via the crossbar switch.

Also, when the computer 10 attempts to read from the common memory, the CPU of the computer 10 generates a read address and delivers the generated read address to the memory adapter 300 via the I/O slot.

The I/O controller of the memory adapter 300 receives the read address and transmits the received read address to the instruction/data generation module of the master-protocol-processing unit. The instruction/data generation module transforms the read address into a read instruction, and the packet transmission module transforms the read instruction into a packet and transmits the packet to the common memory 400 through the adapter serial transceiver.

Here, the adapter serial transceiver may transmit the packet in the form of a signal, in which case the signal may be at least one of an optical signal, an electric signal, and a radio-wave signal. The packet transmitted in the form of a signal may be delivered to the common memory interface of the common memory 400 through at least one of an optical cable, electric cable, and air medium.

The memory serial transceiver receives the read instruction and transmits the same to the instruction/write-data-processing module of the slave-protocol-processing unit via the packet reception module, and the instruction/write-data-processing module transforms the read instruction into an address and delivers the address to the crossbar switch.

The read instruction transformed into an address is delivered to the memory cell at the address corresponding to the read instruction in the physical memory array. Then, read data are generated by reading from the physical memory array and are delivered to the read data generation module of the slave-protocol-processing unit via the crossbar switch. The read data, transformed into a form suitable for packet transmission in the read data generation module, are again transformed into a packet in the packet transmission module, and are delivered to the memory adapter via the memory serial transceiver.

The read data received by the memory adapter pass through the packet reception module and are then transformed into a form suitable for the I/O controller in the read-data-processing module. Then, the read data are delivered to the CPU of the computer 10 via the I/O slot of the computer 10. Also, the CPU may store the received read data in the memory of the computer 10, or may itself use the read data.

As described above, because the memory adapter 300 of the apparatus for sharing memory between computers according to an embodiment of the present invention may access all memory areas of the common memory 400, each of the first to N-th computers may access the common memory 400 as if it had the entire area of the common memory. Also, when they access the common memory 400, the first to N-th computers may use the physical memory array of the common memory 400 in the same manner as the method of accessing the main memory thereof.

Also, according to the apparatus for sharing memory between computers according to an embodiment of the present invention, the number of memory access attempts linearly increases such that excessive access to the memory resources in the computer is prevented, and a bottleneck may be avoided when the CPU of the computer processes data.

Figure 6:
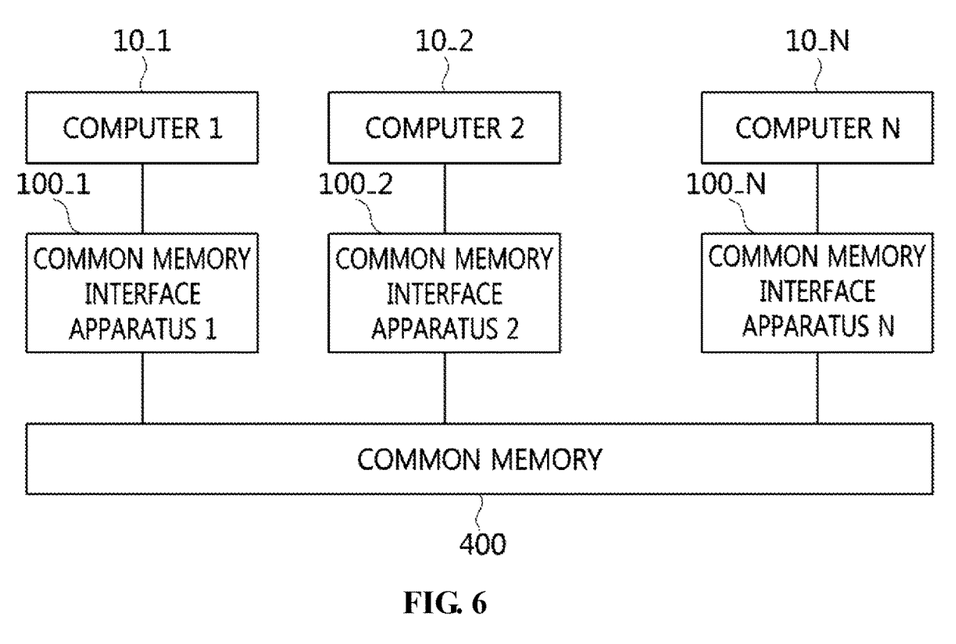
FIG. 6 is a block diagram that shows a distributed computer system including an apparatus for interfacing with common memory according to an embodiment of the present invention.

FIG. 6 is a block diagram that shows a distributed computer system including an apparatus for interfacing with common memory according to an embodiment of the present invention.

Referring to FIG. 6, the distributed computer system including the apparatus for interfacing with common memory according to an embodiment of the present invention is configured such that computers 10_1, 10_2 and 10_N access common memory 400 by being connected with corresponding ones of the common memory interface apparatuses 100_1, 100_2 and 100_N.

Figure 7:
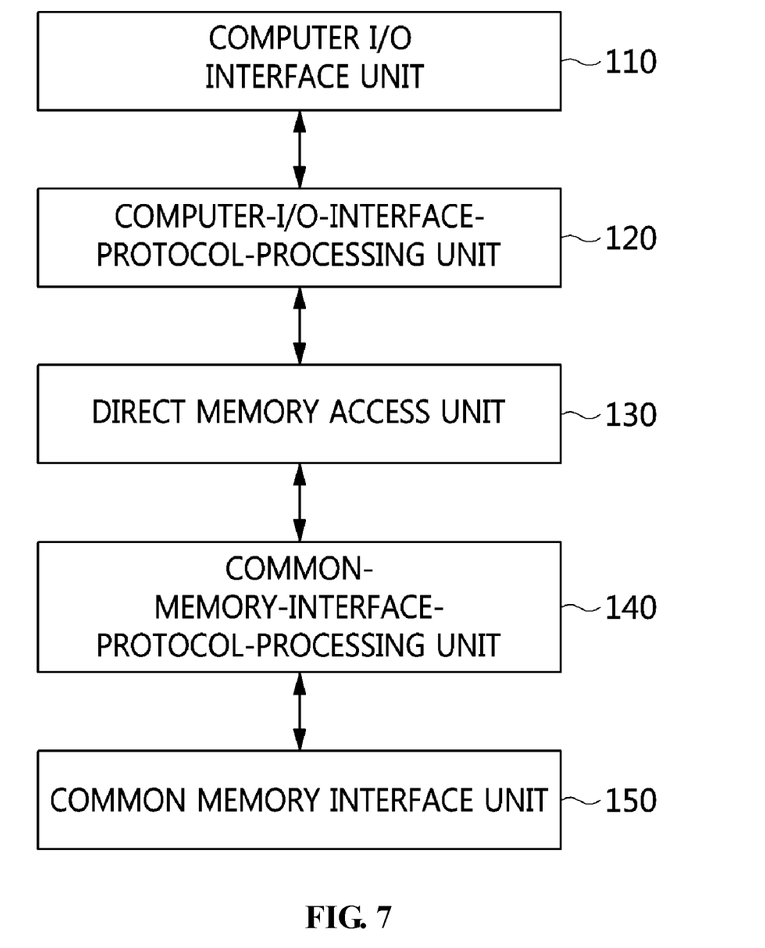
FIG. 7 is a block diagram that shows an apparatus for interfacing with common memory according to an embodiment of the present invention.

FIG. 7 is a block diagram that shows an apparatus for interfacing with common memory according to an embodiment of the present invention.

Referring to FIG. 7, the computer input/output (I/O) interface unit 110 may be an internal/external I/O interface within a computer.

For example, the external I/O interface may be a Universal Serial Bus (USB), and the internal I/O interface may be a Peripheral Component Interconnect Express (PCIe) interface.

Because the internal/external I/O interfaces have their own protocols, these protocols may be processed by the computer-I/O-interface-protocol-processing unit 120.

The computer-I/O-interface-protocol-processing unit 120 may receive a packet for accessing the common memory 400 from a computer through the computer I/O interface unit 110.

The direct memory access unit 130 may transform the packet into an instruction for performing any one of reading from and writing to the common memory 400.

Here, the direct memory access unit 130 may transform the received USB packet or the received PCIe packet into an instruction corresponding to a read instruction or a write instruction.

Here, the direct memory access unit 130 may transform the packet into a format that is suitable for the interface of the common memory 400.

Here, the direct memory access unit 130 may record the instruction after it records the address of the common memory 400 and the physical address of the memory of the computer.

Here, the direct memory access unit 130 may record the address of the common memory 400, the physical address of the memory of the computer, and the instruction such that the space for the address of the common memory 400, the space for the physical address of the memory of the computer, and the space for the instruction are separate.

Here, the direct memory access unit 130 records information about whether execution of the instruction is completed and causes an interrupt, thereby notifying the computer of the information about whether execution of the instruction is completed.

The computer-I/O-interface-protocol-processing unit 120 may notify the computer of the information about whether execution of the instruction is completed through the computer I/O interface unit 110.

The common-memory-interface-protocol-processing unit 140 may check whether execution of the instruction for the common memory 400 is completed.

Here, the computer reads an instruction/state field at regular intervals, thereby checking whether execution of the instruction sent by itself is completed.

Here, the common-memory-interface-protocol-processing unit 140 may receive information about whether execution of the instruction is completed from the common memory 400.

The common memory interface unit 150 may receive an instruction from the common-memory-interface-protocol-processing unit 140 and transmit the same to the common memory. Also, the common memory interface unit 150 may receive information about whether execution of the instruction is completed from the common memory 400 and deliver the same to the common-memory-interface-protocol-processing unit 140.

For example, the common memory interface unit 150 may use serial signals or parallel signals, and electricity, an optical medium, or an air medium (wireless medium) may be used as the medium therefor.

Figure 8:
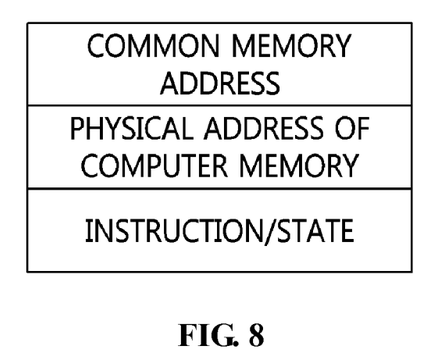
FIG. 8 is a view that shows a direct memory access command field according to an embodiment of the present invention.

FIG. 8 is a view that shows a direct memory access command field according to an embodiment of the present invention.

Referring to FIG. 8, the direct memory access command field according to an embodiment of the present invention may include a common memory address field, a computer memory physical address field, and an instruction/state field.

The common memory address, the physical address of computer memory, and the instruction/state are recorded in the separate spaces.

Here, the common memory address may be determined depending on the size of the common memory, and the physical address of computer memory may be determined depending on the size of the computer memory.

Also, if an instruction is recorded before the common memory address and the physical address of computer memory are recorded, the instruction may be delivered to the wrong address. Therefore, the instruction may be recorded after the addresses are recorded.

Figure 9:
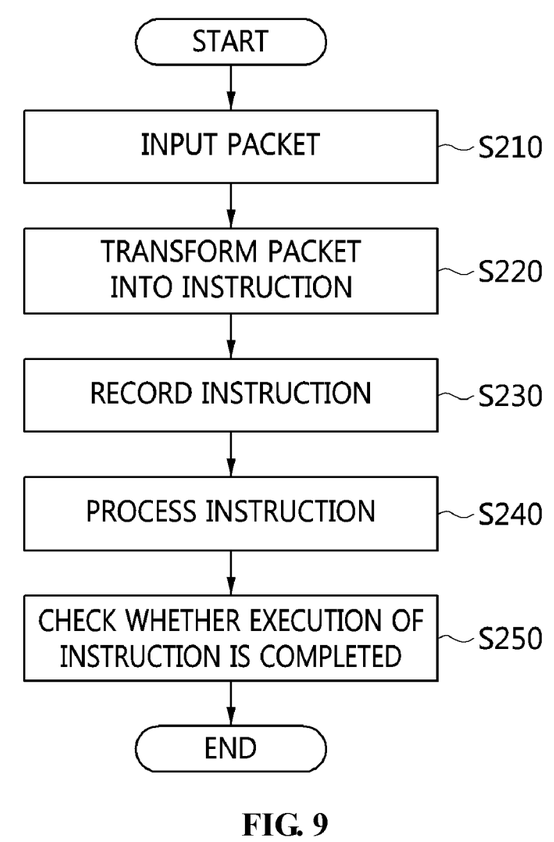
FIG. 9 is a flowchart that shows a method for interfacing with common memory according to an embodiment of the present invention.

FIG. 9 is a flowchart that shows a method for interfacing with common memory according to an embodiment of the present invention.

Referring to FIG. 9, in the method for interfacing with common memory according to an embodiment of the present invention, first, a packet may be input at step S210.

That is, at step S210, a packet for accessing the common memory 400 may be input from a computer.

Also, in the method for interfacing with common memory according to an embodiment of the present invention, the packet may be transformed into an instruction at step S220.

That is, at step S220, the packet may be transformed into an instruction for performing any one of reading from and writing to the common memory 400.

Here, at step S220, the input USB packet or the input PCIe packet may be transformed into an instruction corresponding to a read or write instruction.

Here, at step S220, the packet may be transformed into a format suitable for the interface of the common memory 400.

Also, in the method for interfacing with common memory according to an embodiment of the present invention, the instruction may be recorded at step S230.

That is, at step S230, after the address of the common memory 400 and the physical address of the memory of the computer are recorded, the instruction may be recorded.

Here, at step S230, the address of the common memory 400, the physical address of the memory of the computer, and the instruction may be recorded such that the space for the address of the common memory 400, the space for the physical address of the memory of the computer, and the space for the instruction are separate.

Here, at step S230, a read or write instruction may be recorded, and the instruction may be transmitted to the common memory.

Also, in the method for interfacing with common memory according to an embodiment of the present invention, the instruction may be processed at step S240.

That is, at step S240, the read or write instruction is transmitted to the common memory 400, and the operation corresponding to the instruction may be performed in the common memory.

Also, in the method for interfacing with common memory according to an embodiment of the present invention, whether execution of the instruction is completed may be checked at step S250.

That is, at step S250, whether the operation corresponding to the instruction is completed in the common memory 400 may be checked.

Here, at step S250, information about whether execution of the instruction is completed is recorded, and an interrupt is caused, whereby information about whether execution of the instruction is completed may be made known to the computer.

Here, at step S250, each computer may read the instruction/state field at regular intervals, thereby checking whether execution of the instruction sent by itself is completed.

Here, at step S250, the information about whether execution of the instruction is completed is received from the common memory 400, and the information may be made known to the computer.

According to an embodiment of the present invention, the address spaces of respective computers are separate from the address space of the common memory, whereby the common memory may be configured such that it is not contained within the address spaces of the respective computers.

Here, after each computer transmits a read or write instruction, whether execution of the instruction is completed is checked through periodical checking of a state field or through an interrupt. Accordingly, each computer may perform another task after it transmits the instruction.

Also, because each computer merely accesses the direct memory access unit 130 of its own apparatus for interfacing with common memory without the need to directly access the common memory, the computer may use the common memory any time regardless of whether another computer is using the common memory.

Accordingly, a system error caused when a computer accesses common memory and waits for a response during exclusive transmission/reception by another computer may be prevented.

According to the present invention, it is possible to solve the problem in which the number of memory access attempts increases exponentially when shared data are distributed across the memory of respective computers.

Also, according to the present invention, the number of data exchanges caused when data shared between multiple computers are distributed in the memory of the respective computers may be sharply decreased so as to change linearly with the number of computers.

Also, according to the present invention, it is possible to solve the problem in which, when shared data are stored intensively in a single computer, a bottleneck is formed in the CPU of the corresponding computer and the network load thereof increases.

Also, according to the present invention, a bottleneck that may be caused because the CPU of the computer storing shared data is solely responsible for the supply of the data may be eliminated.

As described above, the apparatus and method for interfacing with common memory according to the present invention are not limitedly applied to the configurations and operations of the above-described embodiments, but all or some of the embodiments may be selectively combined and configured, so that the embodiments may be modified in various ways.

What is claimed is:

1. An apparatus for interfacing with a common memory including a plurality of interfaces, the apparatus comprising:
    a plurality of computers, each computer comprising a common memory adapter configured to:
        receive an address corresponding to an instruction for accessing the common memory from the computer;
        transform the address into the instruction in the form of a packet for performing any one of reading from and writing to the common memory;
        transmit the instruction in the form of a packet to the common memory; and
        receive information about whether execution of the instruction is completed from the common memory,
    wherein each common memory adapter of the plurality of computers is coupled to a respective interface of the common memory,
    wherein each computer records an address of the common memory, a physical address of a memory of the computer, and the instruction to a memory field,
    wherein the memory field comprises a field for recording the address of the common memory, a field for recording the physical address of the memory of the computer, and a field for recording the instruction,
    wherein the instruction is recorded after recording the address of the common memory and the physical address of the memory of the computer,
    wherein the address of the common memory, the physical address of the memory of the computer, and the instruction correspond to different spaces of the memory of the computer,
    wherein the common memory receives the instruction in the form of a packet from the common memory adapter, transforms the instructions into the address, performs the instruction for the memory cell corresponding to the address, and transmits the result of performing the instruction for the memory cell to the common memory adapter,
    wherein the common memory adapter records the information of the result in the field for recording the instruction of the memory field, and causes an interrupt, and
    wherein the computer recognizes the interrupt and checks whether execution of the instruction is completed through the interrupt.

2. The apparatus of claim 1, wherein each common memory adapter includes an adapter serial transceiver coupled in a one-to-one manner to a memory serial transceiver of the respective interface of the common memory.

3. A method for interfacing a plurality of computers to a common memory, the plurality of computers being respectively coupled to a plurality of memory adaptors, and the common memory having a plurality of interfaces respectively coupled to the plurality of memory adaptors, the method comprising:
    receiving, by a memory adaptor from a respective computer, an address corresponding to an instruction for accessing the common memory;
    transforming, by the memory adaptor, the address into the instruction in the form of a packet for performing any one of reading from and writing to the common memory; and
    transmitting, by the memory adaptor using a respective interface of the common memory, the instruction in the form of a packet to the common memory, and
    receiving, by the memory adaptor using the respective interface, information about whether execution of the instruction is completed from the common memory,
    wherein each computer records an address of the common memory, a physical address of a memory of the computer, and the instruction to a memory field,
    wherein the memory field comprises a field for recording the address of the common memory, a field for recording the physical address of the memory of the computer, and a field for recording the instruction,
    wherein the instruction is recorded after recording the address of the common memory and the physical address of the memory of the computer,
    wherein the address of the common memory, the physical address of the memory of the computer, and the instruction correspond to different spaces of the memory of the computer,
    wherein the common memory receives the instruction in the form of a packet from the common memory adapter, transforms the instructions into the address, performs the instruction for the memory cell corresponding to the address, and transmits the information the result of performing the instruction for the memory cell to the common memory adapter, wherein the common memory adapter records the information of the result in the field for recording the instruction of the memory field, and causes an interrupt, wherein the computer recognizes the interrupt, and checks whether execution of the instruction is completed through the interrupt.

4. The method of claim 3, wherein the memory adaptor includes an adapter serial transceiver coupled in a one-to-one manner to a memory serial transceiver of the corresponding interface of the common memory.

5. A system for sharing data using a common memory, the system comprising:
   a plurality of computers;
   a plurality of memory adapters respectively coupled to the plurality of computers; and
   the common memory including:
      a plurality of interfaces respectively coupled to the plurality of memory adapters, and
      a physical memory array;
   wherein the system is configured to communicate data between the computers and the physical memory array of the common memory by:
      sending an address corresponding to an instruction from a computer to a respective memory adapter,
      transforming the address received by the memory adapter into the instruction in the form of a packet,
      transmitting the instruction in the form of a packet from the memory adapter to a respective interface of the common memory; and
      sending information about whether the common memory has completed execution of the instruction from the common memory to the memory adapter using the interface of the common memory that is coupled to the memory adapter,
   wherein each computer records an address of the common memory, a physical address of a memory of the computer, and the instruction to a memory field,
   wherein the memory field comprises a field for recording the address of the common memory, a field for recording the physical address of the memory of the computer, and a field for recording the instruction,
   wherein the instruction is recorded after recording the address of the common memory and the physical address of the memory of the computer,
   wherein the address of the common memory, the physical address of the memory of the computer, and the instruction correspond to different spaces of the memory of the computer,
   wherein the common memory receives the instruction in the form of a packet from the common memory adapter, transforms the instructions into the address, performs the instruction for the memory cell corresponding to the address, and transmits the information the result of performing the instruction for the memory cell to the common memory adapter,
   wherein the common memory adapter records the information of the result in the field for recording the instruction of the memory field, and causes an interrupt,
   wherein the computer recognizes the interrupt, and checks whether execution of the instruction is completed through the interrupt.

6. The system of claim 5,
   wherein each memory adapter includes an adapter serial transceiver,
   wherein each interface of the common memory includes a memory serial transceiver, and
   wherein the adapter serial transceivers of the plurality of memory adapters are respectively coupled in a one-to-one manner to the memory serial transceivers of the plurality of interfaces of the common memory.

7. The system of claim 5,
   wherein the common memory further comprises a crossbar switch, and
   wherein each interface of the common memory is coupled to the physical memory array through the crossbar switch.

* * * * *